Oct. 8, 1968 J. O. FUNDINGSLAND 3,404,848

MAGNETIC RECORDING TAPE CARTRIDGE

Filed Nov. 20, 1964

INVENTOR.

JOHN O. FUNDINGSLAND

BY

Richard W. Hanson

ATTORNEY

3,404,848
MAGNETIC RECORDING TAPE CARTRIDGE

John O. Fundingsland, 1126 N. Sheridan St., Colorado Springs, Colo. 80909

Filed Nov. 20, 1964, Ser. No. 412,679
3 Claims. (Cl. 242—55.13)

The present invention relates generally to self-contained magnetic recording tape cartridges of the type having freely rotatable supply and take-up reels which are coupled to rotate together by a movable linkage which is driven by the rotation of the supply reel as the tape is pulled therefrom in response to a force applied to the tape. More specifically, the invention is an improvement over a tape storage apparatus disclosed in United States Patent No. 3,096,038, comprising novel mountings for the linkage and tape storage reels which greatly simplify the construction of the cartridge and simultaneously improve its performance.

The basic components of the apparatus of the present invention are similar to those described in the aforesaid patent in that two co-planar tape storage reels are mounted for free rotation on spaced parallel axes and are operatively coupled together by a rotatable shaft having a wheel affixed to each end thereof which is in rollable contact with a flange of one of the reels. The shaft is mounted for reversible translation along a path substantially perpendicular to the axes of the reels and parallel to a plane defined by the axes. The shaft is also pivotal about a transverse axis which is parallel to the reel axes so that the shaft may become skew to the axes of the reels, that is, angularly oriented to the radius of each tape storage reel.

In the said prior disclosure the means for supporting the coupling shaft, in order to permit the necessary freedom of movement, involved a structure which, because of its complexity and detail, severely limited the employment of the inventive concept in small storage apparatus. A second disadvantage of the prior mechanism becomes especially apparent when considering the use of relatively small reels, for example, those of two to three inch diameter. Thirdly, with the prior reel spindle arrangement, the pressure of the coupling wheels against the flanges of the tape reels created a force moment about the reel axes which tended to cock the reels and cause undesirable binding against the reel spindles.

It is, therefore, the primary objective of the present invention to provide solutions to the problems of the previous apparatus with a novel housing structure making possible the use of new and improved means for supporting the coupling shaft and mounting the reel spindles.

A further objective of the present invention is to provide a unitary combination of rotatable and pivotal support and bias means for the coupling shaft in order to eliminate the need for separate springs and mounting devices.

A still further objective is to provide a cartridge type housing for the improved tape storage apparatus which may advantageously serve in small and large models alike as a housing member and a functional component in providing the improved performance of the apparatus of this invention.

Others and still further objects, features and advantages of the invention will become apparent from a reading of the following description of the invention which is taken in conjunction with the accompanying drawings in which.

Figures 1, 2, 3, 4:
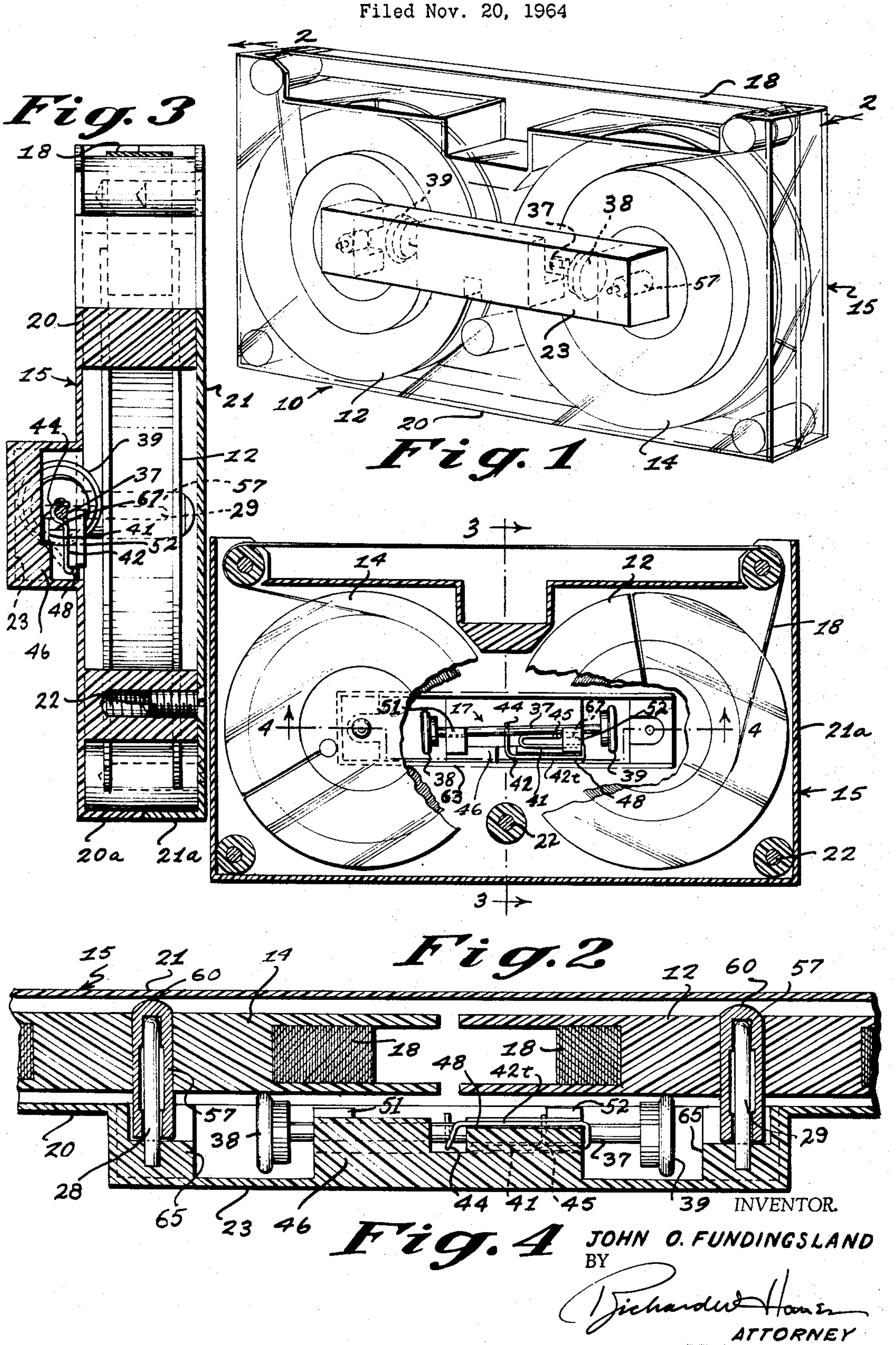
FIGURE 1 is a perspective view of the tape storage cartridge of the present invention.
FIGURE 2 is a cross sectional view taken along lines 2—2 of FIGURE 1. Portions of the tape storage reels are broken away to reveal the details of the coupling apparatus.
FIGURE 3 is a transverse cross-sectional view of the cartridge taken along lines 3—3 of FIGURE 2.
FIGURE 4 is an enlarged fragmentary cross-sectional view of the cartridge taken along lines 4—4 in FIGURE 2.

In brief, the invention comprises an extended platform integrated with housing walls to provide a cartridge or magazine for the tape storage apparatus and which cooperates with a dual reel spindle and bearing arrangement and with a shaft-cradling spring means to bring about the improved results attributed to the invention.

Referring now to the drawings, a cartridge 10 according to the present invention is seen in FIGURE 1. Two flanged tape storage reels 12 and 14 are disposed within a parallel sided case 15 and a length of magnetic recording tape 18 is wound upon the two reels. In the preferred form of the invention, as illustrated, the case serves not only as a convenient means of covering and packaging the tape reels, but also as a functional element in mounting the reels and the coupling mechanism generally indicated by reference numeral 17. The case 15 is comprises two side members 20 and 21 parallel to each other and to the flanges of the tape reels 12 and 14. Each of these side wall members 20 and 21 of the cartridge are provided with upturned right angled edges **20*a* and 21*a* respectively, which abut together to complete the enclosure of the tape storage apparatus. Although screws 22 are illustrated as the means for locking the sides 20 and 21 of the cartridge case together it will be understood that detent snap locks or other means can readily be designed into the case without effecting the inventive structure to be described. Superposed over the coupling mechanism 17 and extending longitudinally over the axes of the tape reels 12 and 14 is a platform 23 integrated with and dependent from the side 20. As will be descriged subsequently in greater detail, this platform 23** and its adjuncts cooperate to provide a more frictionless support for the rotatable reels and a simpler and substantially more efficient support for the coupling shaft, the latter being made possible largely because of the former.

Prior to further explanation it will be noted that the present tape storage apparatus employs a reel coupling device 17 similar in its basic concept and operation to that shown and described in my previously referred to patent, No. 3,096,038. Inasmuch as the theory and operation of the coupling is explained in that patent disclosure it will be unnecessary to further detail its mode of operation in this description. The coupling illustrated in the present embodiment includes a cylindrical shaft 37 having a pair of resilient wheels 38 and 39 mounted thereon and secured at each end of the shaft 37. The shaft is located between the inside surface of the dependent platform 23 and the tape reels 12 and 14 and is supported only by an L shaped torsion spring 42, the long leg $\mathbf{42_t}$ of which acts as the torsion member and the short leg of which cradles the shaft 37 in a crescent shaped hook 44 at its outer end. Thus it is seen that the mechanically simple features of the present invention serve to eliminate the movable carriage, guides, pivot pins and yoke of the prior disclosure while at the same time giving unexpectedly good results. In fact the use of the torsion spring, as illustrated, brings about another advantage. By extending the torsion leg $\mathbf{42_t}$ of the spring into a pair of angles so that the torsion leg $\mathbf{42_t}$ becomes one side of a U shaped member, the other side 41 forms a second spring 45 having an upturned hairpin end for furnishing the skew bias to the coupling shaft. In addition to the obvious economy of parts, such an arrangement lends itself to a self-retaining mounting of the spring. A raised central portion 46 of the platform 23 acts as the base for the spring 42. The torsion leg $42_t$ of the spring 42 is disposed in an open slot 48 in the top of the base 46 while the skew spring portion 41 of the assembly lies below and transversely off-set from the torsion leg. The opposing forces exerted by the springs maintain them in position throughout the operation of the device. If desired, the torsion leg and cradle portion of the spring can easily be made and mounted separately from the skew biasing spring 45 but the combination of the two enjoys the benefit of decreasing cost and the mutual action and reaction of the two spring members helps maintain both of them in place.

In order to hold the shaft in position and thereby facilitate the assembly of the tape storage device a pair of spaced apart stops 51 and 52 are attached to the upper surface of the spring base member 46. The stops extend over the shaft 37 in a direction normal to the slot 48 and act to restrict and limit the spring urged upward movement of the shaft in the absence of the tape reels 12 and 14. When the reels 12 and 14 are placed on their respective spindles 26 and 28 the wheels 38 and 39 are depressed downwardly against the force of the shaft supporting cradle spring 42, thus establishing the necessary frictional engagement of the wheels with the flanges of the reels against which they drive in order to provide the required coupling.

Referring again to the shaft supporting spring 42, it will be apparent that although a wire spring member is described and illustrated the invention is not so confined. A leaf spring for example could also be beneficially used in some applications. The wire spring however, appears to offer the greatest number of advantages. The wire cradle 44 allows the shaft 37 a freedom of translational movement while at the same time permitting a pivotal motion of the shaft into a skew position, all with the low friction associated with a thin line contact such as the one between the wire cradle 44 and the periphery of the shaft 37.

The economic advantages of the improved support make possible the large scale use of tape storage cartridges according to this invention. Another particular advantage of the spring member just described is the achievement of smoothness in response resulting from the action of the torsion leg $42_t$. Without this feature a spring arm perpendicular to the shaft would have to be of such length that its use would be limited to large cartridges or large reel-to-reel type apparatus.

It will be apparent to those acquainted with the mode of operation of the coupling system and with its servomechanism characteristics that great freedom of translational and pivotal movement of the shaft is necessary for proper operation and fast response. Equally obvious is the fact that if the pressure of the cradle spring 42 against the shaft is too great the friction between the hook member 44 and the shaft 37 will diminish the translational and pivotal freedom of the coupling shaft. The necessary biasing force of the cradle spring 42 is of course proportional to the force required to drive the tape reels by the frictional engagement of the coupling wheels 38 and 39 and the reel flanges. In this connection reel bearing friction becomes important, however to the ordinary considerations of reel bearing friction a second factor is added by the coupling system itself. No matter how slight it may be, the off-center loading force of a wheel on the flange of the reel tends to tilt or cock the reel so that areas of high friction or "binding" are created between the spindle and bearing along the outermost edges of the reel bearing. The effect is more pronounced as the reel bearing span becomes shorter with respect to the perpendicular distance from the axial center of the bearing to the line of action of the force applied to the reel flange by the coupling wheel which bears against it. Conversely the adverse effect is reduced as the bearing span is lengthened and the spring adjustments become less critical.

Thus, as an additional and further feature of the present invention the off-set platform provides a means for substantially increasing the bearing span and achieving consequent reductions in bearing friction which go far to making the cradle spring support for the shaft 37 feasible. Each end of the platform 23 carries an upstanding spindle 26 and 28 respectively. The spindles are parallel to each other and perpendicular to the platform 23. Since the platform is at a greater distance from the reel than is the side of the case 20 it is possible to elongate the reel bearing 57, as shown particularly in FIGURE 4, and obtain the benefits of a longer bearing span. Although the bearing 57 is illustrated as a separate piece which is made an insert to an ordinary prior art tape reel having an axial center aperture, the bearing may be molded as a part of the reel.

When in the position shown in FIGURE 4 the weight of the reel is supported by the rounded top end of the spindle by which it is mounted, thus producing a minimal friction contact between spindle and bearing. In addition, the center of the bearing 57 is relieved next to the supporting spindle to eliminate any unnecessary contact between spindle and bearing.

In its inverted position the same beneficial results are achieved when the rounded outer end 60 of the bearing is supported by the other side 21 of the cartridge case.

The spring base member 46 possesses supplementary advantages to those already enumerated by providing proper surfaces to act as limiting stops for the shaft 37. By reference to FIGURE 2 it can be clearly seen that without appropriate stop means some momentary condition of operation could cause one of the coupling wheels to strike the upstanding side wall 63 and interrupt the operation of the cartridge. Likewise, excessive translational movement of the shaft might result in one of the wheels 38 or 39 interferring with the raised portion 65 of the platform 23 which secures the spindles 28 and 29 which would also adversely interrupt the smooth flow of tape. To obviate the first of said possible difficulties small forwardly projecting piers 67 are situated below the vertical motion stops 51 and 52 and have flat smooth forward faces and sharp corners to act as stops for unwanted shaft motion in a skew direction. The flat vertical sides of the base 46 are also smooth and offer little resistance when contacted by the inside face of the coupling wheels 38 and 39 under conditions of excessive translational movement.

Having thus described and illustrated the several useful and novel features of the magnetic recording tape cartridge of the present invention, it will be seen that the many and worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. In a recording medium cartridge;
spaced parallel side walls;
at least one reel disposed between the walls and journaled for rotation about an axis perpendicular to the walls;
a sleeve bearing centrally disposed in the reel and having one closed end thereof rounded and protruding from the one side of the reel and having the other open end thereof protruding from the other side of the reel; and
a spindle attached to one of said walls and having a rounded end and disposed within said sleeve bearing so that the said rounded end of the spindle abuts against the inside of the closed end of the bearing.

2. An invertible cartridge for housing a length of elongated record carrier medium, comprising;
a housing;

a pair of spaced apart and co-planar flanged reels journaled for rotation within the housing;

a pair of spaced apart rollers having a common spindle lying in a plane parallel to the plane of the reels and disposed so that each roller may contact the flange of a respective one of the reels;

a thin, elongated and springable support member having a crescent shaped hook on one end thereof, said member being attached to the housing at a point between the two reels, and the said spindle being cradled for support in said hook.

3. A record medium storage cartridge comprising:

a housing including spaced parallel walls;

a platform spaced from and parallel to one of said housing walls and attached thereto;

two recording medium storage reels disposed within the housing;

means mounted on the platform to support said reels for independent rotation about spaced parallel axes;

means operably coupling said reels together, said means including, a shaft, two wheels affixed to said shaft at a separation different from the separation of the axes;

spring means mounted on said platform and comprising a slender elongated finger supporting said shaft for engagement between each of said wheels and one of said reels, for longitudinal translation of said shaft, and for pivotal movement of said shaft about an axis transverse to said shaft; and resilient means biasing said shaft to positions in which the shaft is skew to the axes of the reels, said resilient means and said spring means being a unitary structure.

References Cited

UNITED STATES PATENTS

| | | | |
|---|---|---|---|
| 2,555,531 | 6/1951 | Boord | 242—55.42 |
| 2,914,266 | 11/1959 | Connell | 242—55.14 |
| 3,096,038 | 7/1963 | Fundingsland | 242—55.14 |
| 3,214,108 | 10/1965 | Louzil | 242—55.12 |

GEORGE F. MAUTZ, *Primary Examiner.*